United States Patent
Lin

(10) Patent No.: US 10,245,907 B2
(45) Date of Patent: Apr. 2, 2019

(54) TIRE PRESSURE GAUGE FOR BICYCLE

(71) Applicant: AUDEN TECHNO CORP., Taoyuan County (TW)

(72) Inventor: Tsan-Chen Lin, Taoyuan County (TW)

(73) Assignee: AUDEN TECHNO CORP., Taoyuan County (TW)

( * ) Notice: Subject to any disclaimer, the term of this patent is extended or adjusted under 35 U.S.C. 154(b) by 118 days.

(21) Appl. No.: 15/618,192

(22) Filed: Jun. 9, 2017

(65) Prior Publication Data

US 2018/0354318 A1 Dec. 13, 2018

(51) Int. Cl.
*B60C 23/02* (2006.01)
*B60C 23/04* (2006.01)
*G01L 17/00* (2006.01)

(52) U.S. Cl.
CPC ...... *B60C 23/0496* (2013.01); *B60C 23/0479* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 7/02; G01M 99/00; G01M 1/225; G01M 3/04; G01M 3/40; G01M 5/0091; G01M 99/002; B60C 23/0494; B60C 23/04; B60C 23/0493; B60C 2019/004; B60C 19/00; B60C 23/0498; B60C 23/064; B60C 23/0488; B60C 23/0496; B60C 23/0408; B60C 23/041; B60C 23/0411; B60C 23/20; B60C 11/243; B60C 11/246; B60C 23/06; B60C 23/061; B60C 23/00; B60C 23/0486; B60C 11/0083; B60C 13/003; B60C 2009/2038; B60C 23/003; B60C 23/004; B60C 23/02; B60C 23/0401; B60C 23/0406; B60C 23/0416; B60C 23/0433; B60C 23/0455; B60C 23/0489; B60C 23/0491;
(Continued)

(56) References Cited

U.S. PATENT DOCUMENTS 9,387,732 B1 * 7/2016 Gunawan ............ B60C 23/0408
10,124,635 B1 * 11/2018 Hsiao ................. B60C 23/0496
2017/0197112 A1 * 7/2017 Shiang ............... A63B 24/0062

* cited by examiner

*Primary Examiner* — Andre J Allen
(74) *Attorney, Agent, or Firm* — Li & Cai Intellectual Property (USA) Office

(57) ABSTRACT

A tire pressure gauge for a bicycle is provided. The tire pressure gauge is fastened to an air valve and includes a connector assembly and a gauge assembly. The connector assembly includes a main body and an air-tight member. The main body includes a front member and a connecting member. The main body includes an opening portion, a first thread hole, and an accommodating channel, in which the opening portion and the first thread hole extend inwards, and the accommodating channel is disposed between the opening portion and the first thread hole. The gas-tight member is disposed in the accommodating channel by passing through the opening portion. When disposed in the accommodating channel, the air-tight member can be squeezed by the inner surface of the accommodating channel, and a gap exists between the air-tight member and the accommodating channel in the axial direction.

10 Claims, 9 Drawing Sheets

(58) Field of Classification Search
CPC ... B60C 25/002; B60C 25/005; B60C 25/007;
B60C 29/02; B60C 3/04; B60C 99/00;
B60C 99/006; B60C 11/24; B60C 13/001;
B60C 13/02; B60C 15/0036; B60C 17/02;
B60C 2009/0071; B60C 2009/2022;
B60C 2200/02; B60C 2200/06; B60C
2200/065; B60C 23/001; B60C 23/007;
B60C 23/008; B60C 23/0413; B60C
23/0427; B60C 23/0447; B60C 23/0454;
B60C 23/0459; B60C 23/0467; B60C
23/0471; B60C 23/0472; B60C 23/0474;
B60C 23/0476; B60C 23/0484; B60C
23/065; B60C 23/066; B60C 23/10; B60C
25/0548; B60C 25/056; B60C 25/132;
B60C 25/138; B60C 25/18; B60C 29/005;
B60C 9/005; B60C 9/18; B60C 9/1807;
B60C 9/20; B60C 9/28

See application file for complete search history.

TIRE PRESSURE GAUGE FOR BICYCLE

BACKGROUND OF THE INVENTION

1. Field of the Invention

The present disclosure relates to a tire pressure gauge for a bicycle; more particularly, to a tire pressure gauge fastened to a French air valve of a bicycle.

2. Description of Related Art

A bicycle, especially a road bike having narrow tire section width, requires higher tire pressure lest accidents occur when the bike runs fast while the tire pressure is relatively low. Therefore, to have instant access to tire pressure information is important for a bike rider. Accordingly, the applicant has made efforts to provide a solution that overcomes the above-mentioned problems.

SUMMARY OF THE INVENTION

The main object of the present disclosure is to provide a tire pressure gauge for a bicycle so as to overcome the problem in which cyclists are under risk without having instant access to tire pressure information during riding.

In order to achieve the aforementioned objects, the present disclosure provides a tire pressure gauge for a bicycle, in which the tire pressure gauge is fastened to an air valve and can measure tire pressure at any time during the travel of the bicycle. The tire pressure gauge includes a connector assembly and a gauge assembly. The connector assembly is made of an abrasion-resistant material and includes a main body and a gas-tight member. The main body includes a front member and a connecting member. The front member has a connection end and an extension end. The front member includes an opening portion, a first thread hole, and an accommodating channel, in which the opening portion is located at the connection end for being connected with the air valve. The opening portion extends inwards. The first thread hole is located at the extension end, and the accommodating channel is located between the opening portion and the first thread hole. The opening portion, accommodating channel, and the first thread hole are coaxial and communicate with each other. The axial depth of the opening portion is smaller than that of the accommodating channel, and the axial depth of the accommodating channel is smaller than that of the first thread hole. The connecting member is connected to an end of the front member and integrally formed therewith, and includes a second thread hole communicating with the first thread hole, being coaxial therewith, and having an inner diameter the same as that of the first thread hole. The gas-tight member is disposed in the accommodating channel by passing through the opening portion. The gas-tight member is made of an abrasion-resistant rubber and has an outer diameter smaller than that of the accommodating channel, a thickness smaller than the axial depth of the accommodating channel, and an inner diameter smaller than that of the second thread hole. The gauge assembly is disposed at an end of the connecting member opposite the other end where the connecting member is connected to the front member. The gauge assembly includes a wireless transmission unit and a processing unit, in which the processing unit measures the pressure of the air entering the gauge assembly and generates a tire pressure information correspondingly. The wireless transmission unit is electrically connected to the processing unit and an external communication device so as to transmit the tire pressure information to the external communication device. A part of the air valve is engaged with the first thread hole and the second thread hole, and the gas-tight member is closely engaged with the part of the air valve that is in the accommodating channel.

The present disclosure is advantageous in that, through the technical structure of the front member and the connecting member, the connecting assembly and the gauge assembly connected thereto can be securely fastened to the air valve of a bicycle during the travel of the bicycle. In addition, since the gauge assembly can be fastened to the air valve, a bicycle rider can have instant access to the tire pressure information during riding.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1A:
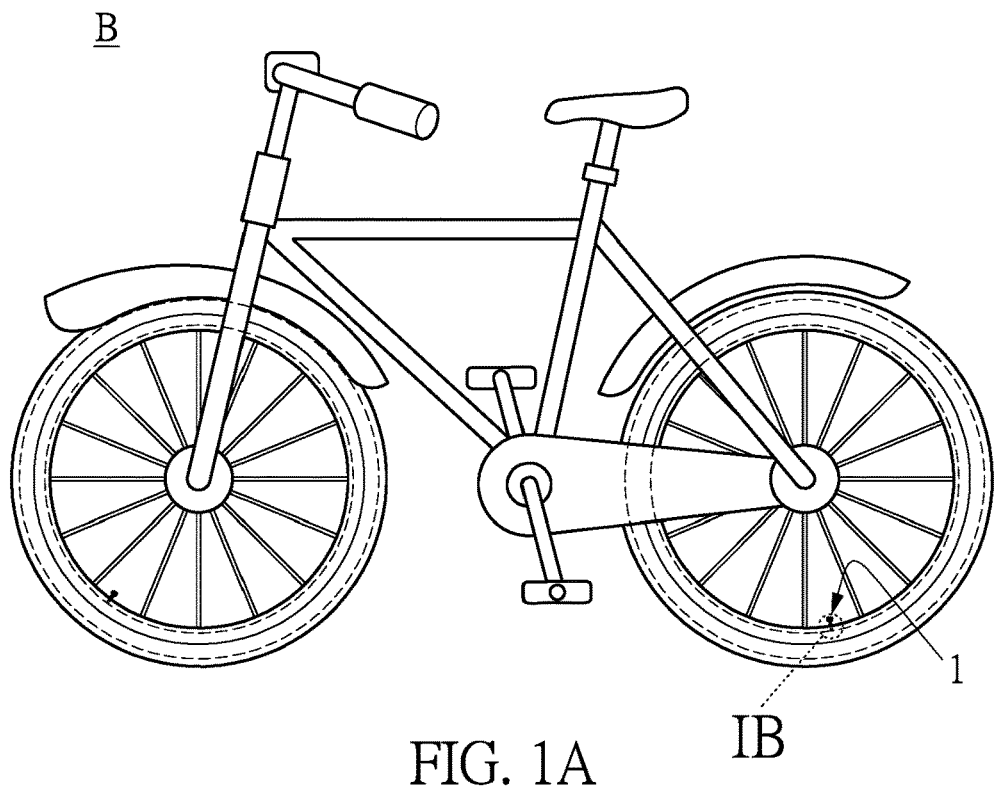
FIGS. 1A and 1B are schematic views illustrating a tire pressure gauge according to the present disclosure installed on a bicycle.
Figure 1B:
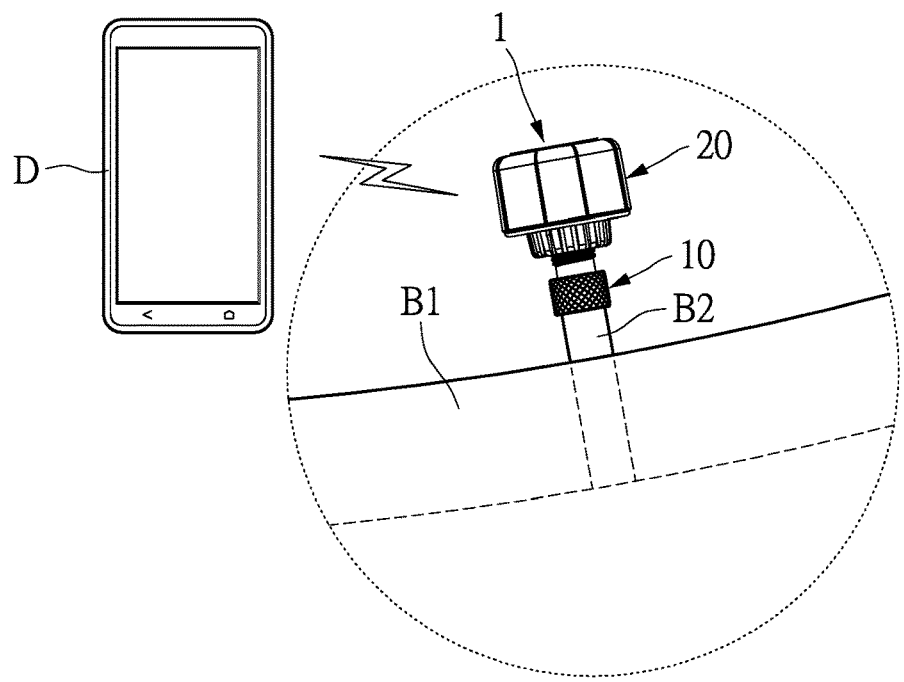
Figure 2:
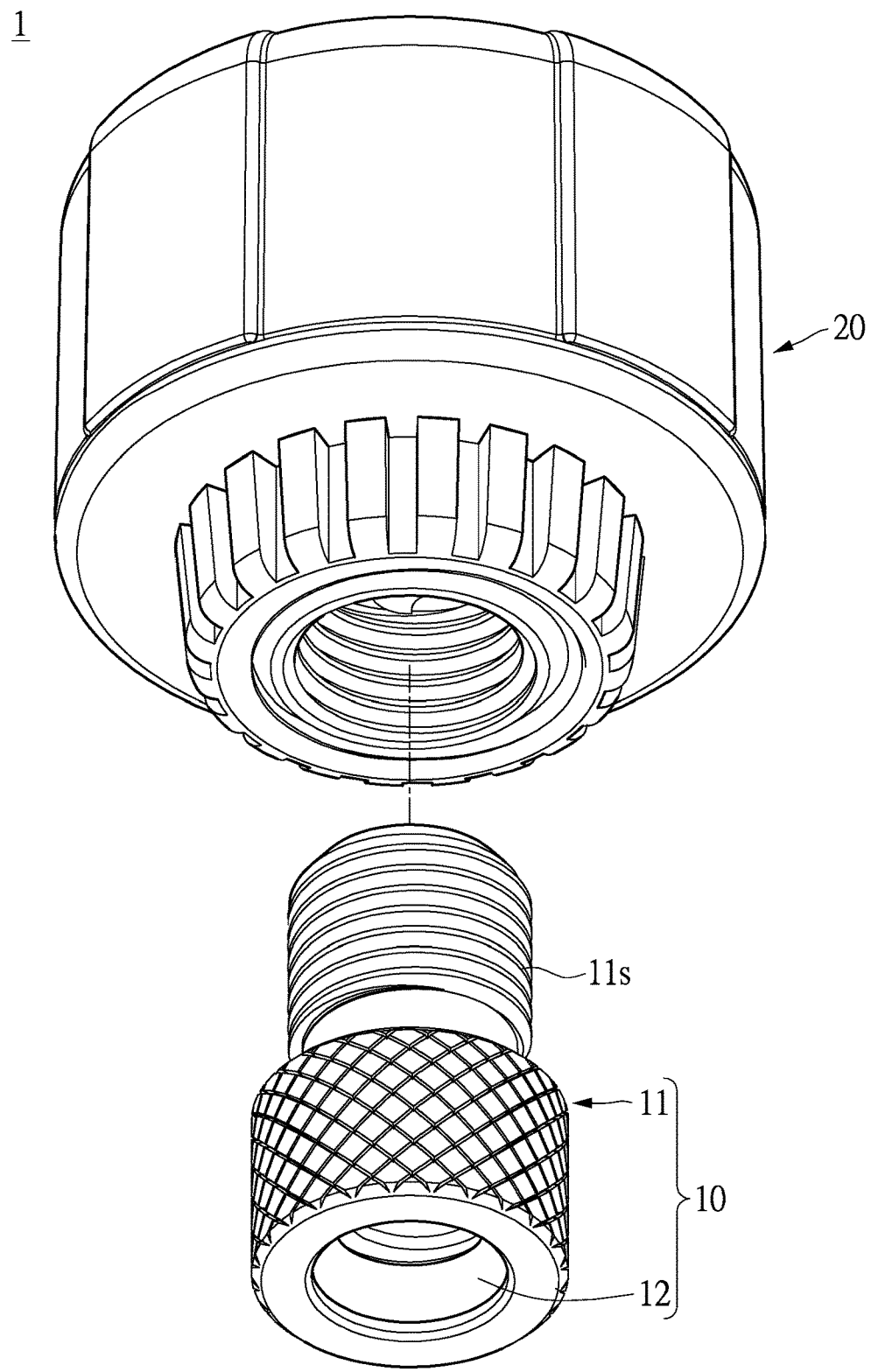
FIG. 2 is a fragmentary schematic view illustrating a connector assembly and a gauge assembly of the tire pressure gauge of the present disclosure.
Figure 3:
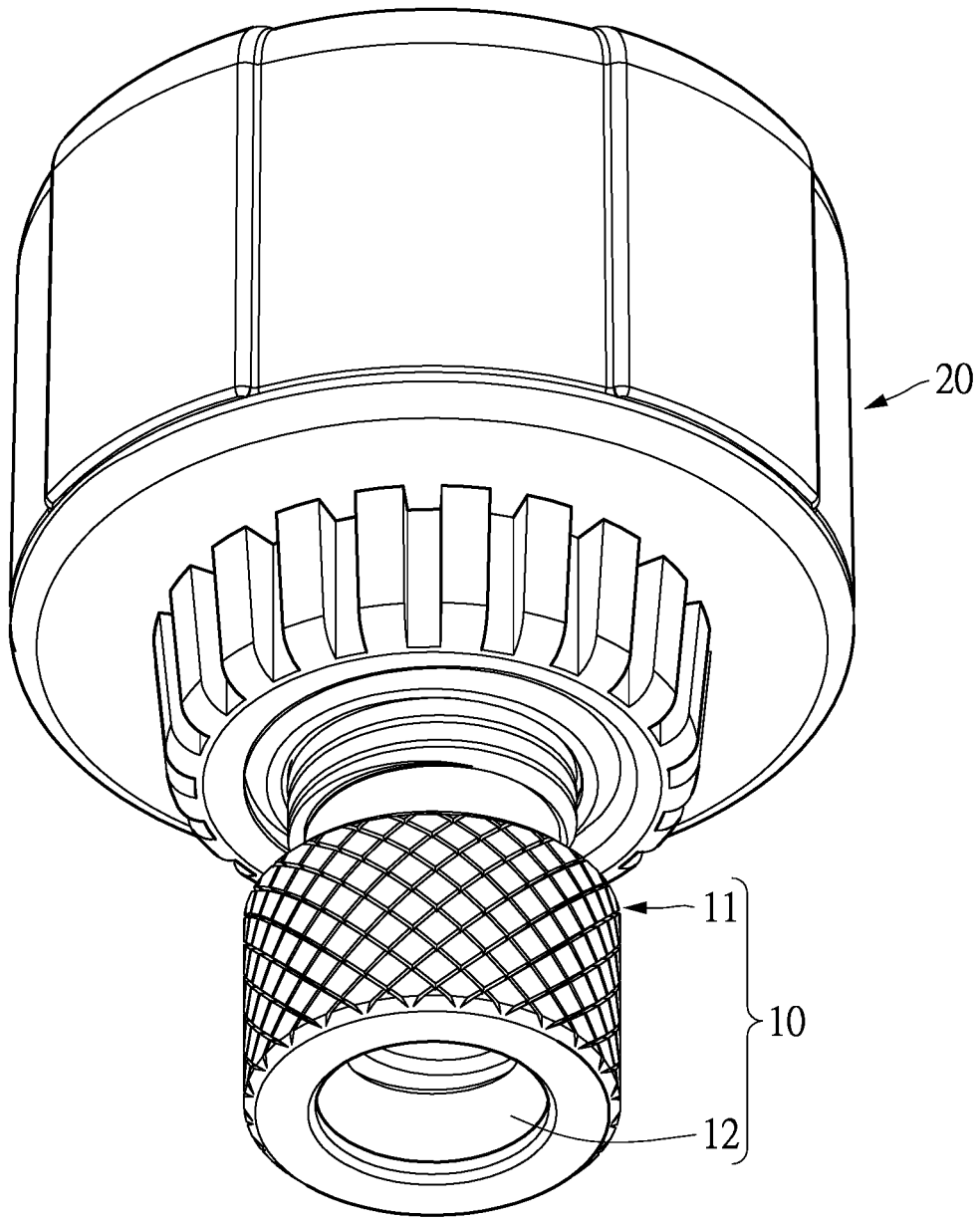
FIG. 3 is a schematic view illustrating the tire pressure gauge of the present disclosure.

Please refer to FIGS. 1 to 3. A tire pressure gauge 1 of the present disclosure can be directly fastened to a French air valve B2 of a tire B1, in which the tire pressure gauge 1 can measure tire pressure anytime during the travel of the tire B1.

With reference to FIGS. 2 and 3, the tire pressure gauge 1 of the present disclosure includes a connector assembly 10 and a gauge assembly 20. The connector assembly 10 is fastened to the French air valve B2, as shown in FIG. 1. The connector assembly 10 includes a main body 11 and an air-tight member 12. A thread structure 11s is formed on the circumference of an end portion of the main body 11, and the gauge assembly 20 can be connected with the connector assembly 10 through the thread structure 11s. In other embodiments, the connection manner between the gauge assembly 20 and the connector assembly 10 can be connection manners other than the aforementioned screw connection.

Figure 4:
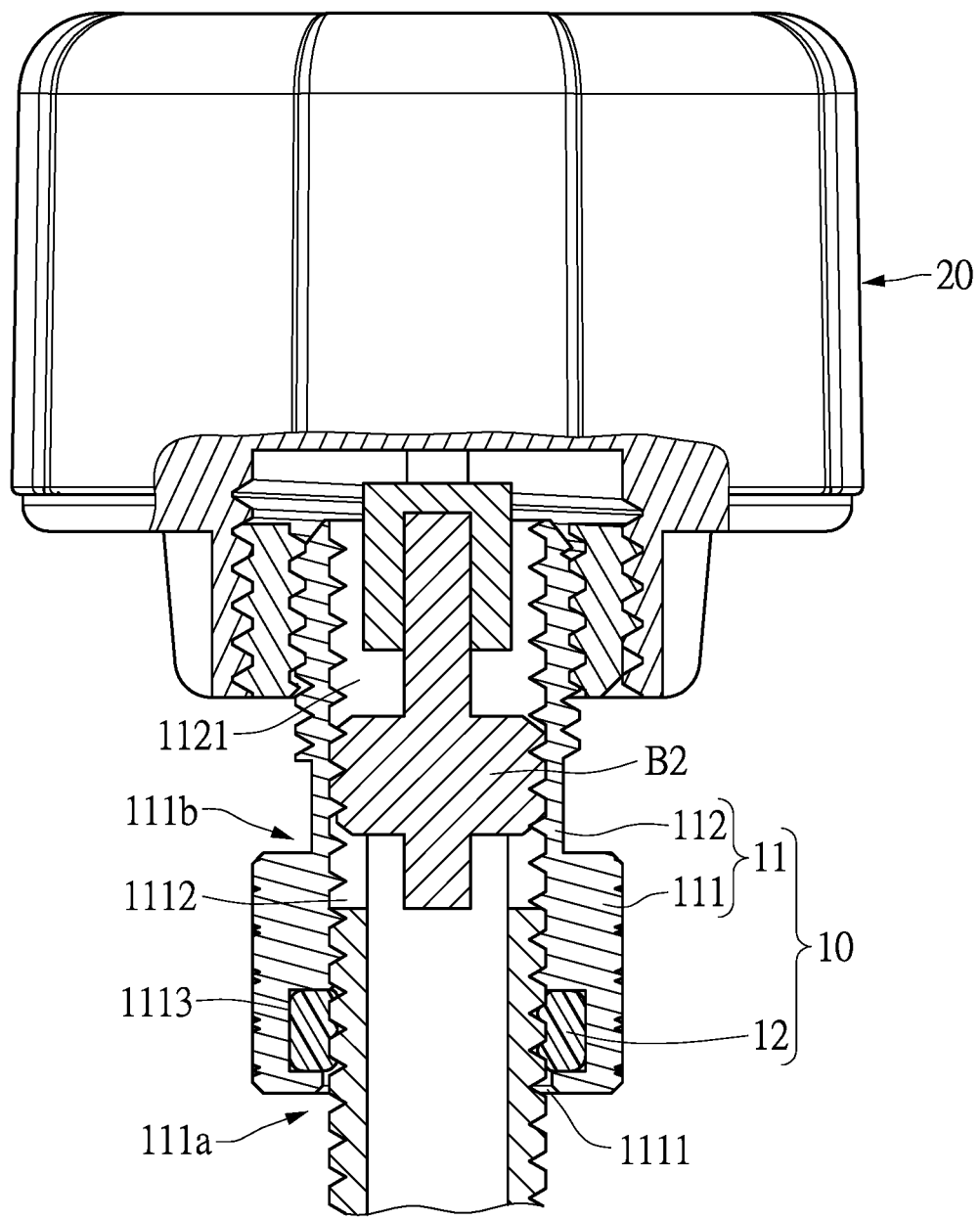
FIG. 4 is a sectional view illustrating the tire pressure gauge of the present disclosure fastened to a French air valve.
Figure 5:
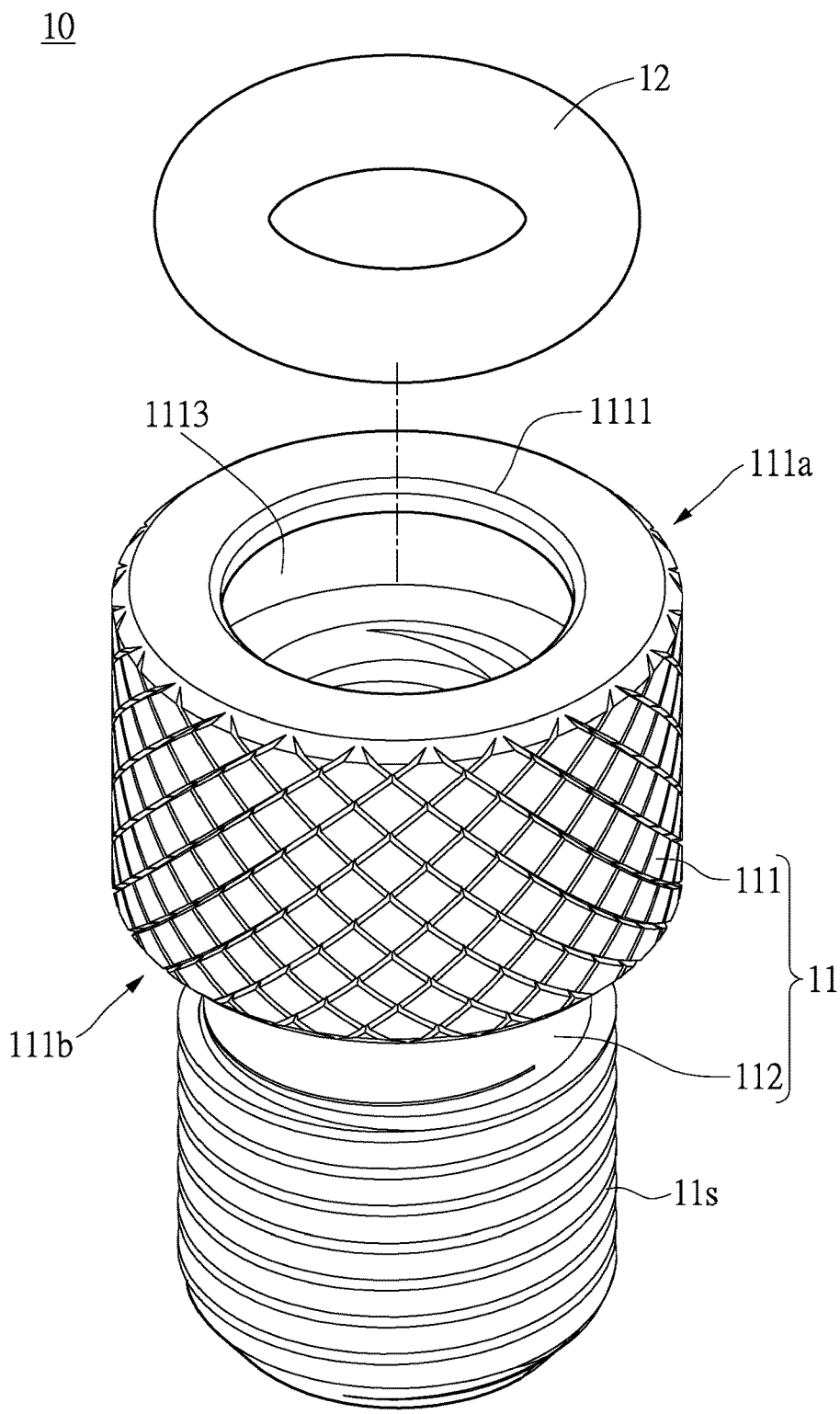
FIG. 5 is an exploded schematic view illustrating the connector assembly of the tire pressure gauge according to the present disclosure.
Figure 6:
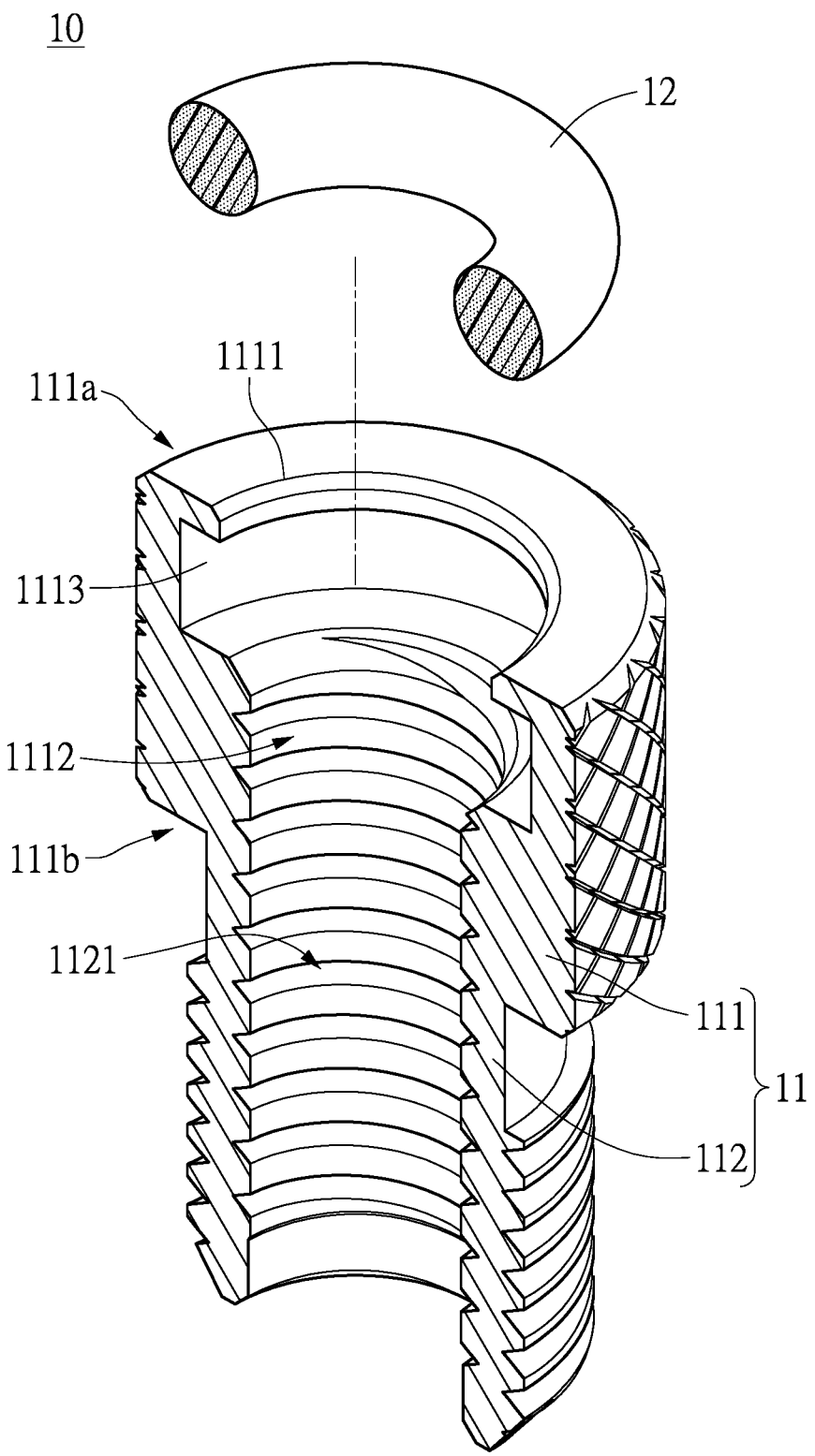
FIG. 6 and FIG. 7 are sectional exploded views illustrating the connector assembly of the tire pressure gauge according to the present disclosure.

With reference to FIG. 4, when the connector assembly 10 is fastened to the French air valve B2, the gas in the tire can enter the gauge assembly 20 through the connector assembly 10, by which the gauge assembly 20 can measure tire pressure. In practice, the gauge assembly 20 can include a wireless transmission unit and a processing unit, in which the processing unit can generate a tire pressure information according to the pressure of the air entering the gauge assembly 20. The present disclosure is not limited by the way the processing unit measures air pressure and generates the tire pressure information. The wireless transmission unit is electrically connected to the processing unit and an external communication device D, which can be exemplified as a smartphone (as shown in FIG. 1B) or a recorder so as to transmit the tire pressure information to the external communication device D. In this way, a bicycle rider can obtain the tire pressure information at any time during riding through the external communication device D.

In other embodiments, the gauge assembly 20 can further include a speed measurement unit (not shown in the drawings) electrically connected to the processing unit, which receives speed information measured by the speed measurement unit and transmits the speed information to the external communication device D through the wireless transmission unit. In this way, the bicycle rider can have instant access to the speed information and the tire pressure information of the bicycle anytime during riding. In another preferred embodiment, the processing unit can generate pedaling frequency information and power information calculated based on the tire pressure information and the speed information.

Please refer to FIGS. 5 to 9. The connector assembly 10 includes a main body 11 and an air-tight member 12. The main body 11 includes a front member 111 and a connecting member 112, in which the front member 111 has a connection end 111a and an extension end 111b. The front member 111 is connected to the French air valve B2 at the connection end 111a, and the connecting member 112 is connected to the front member 111 through the extension end 111b.

Specifically, the front member 111 includes an opening portion 1111 at the connection end 111a that extends inwards. The front member 111 further includes a first thread hole 1112 at the extension end 111b that extends inwards. The first thread hole 1112 is used for being connected to a part of the French air valve B2. That is to say, a thread structure is formed on the inner surface of the first thread hole 1112 that corresponds to the French air valve B2. An accommodating channel 1113 is formed between the opening portion 1111 and the first thread hole 1112. The opening portion 1111, the first thread hole 1112, and the accommodating channel 1113 are coaxial and communicate with each other. The inner diameter 1111D of the opening portion 1111 is smaller than the inner diameter 1113D of the accommodating channel 1113, and the inner diameter 1112D of the first thread hole 1112 is smaller than the inner diameter 1111D of the opening portion 1111. Preferably, the opening portion 1111, the first thread hole 1112, and the accommodating channel 1113 are hollow cylindrical bodies.

A second thread hole 1121 is formed inside the connecting member 112, and is coaxial with the first thread hole 1112. Furthermore, the second thread hole 1121 communicates with the first thread hole 1112 and has an inner diameter the same as that of the first thread hole 1112. Reference is now made to the FIG. 4. When the connector assembly 10 is fastened to the French air valve B2, a part of the French air valve B2 is engaged with the first thread hole 1112 and the second thread hole 1121. In other words, a continual thread structure is formed on the first thread hole 1112 and the second thread hole 1121 to be connected with the French air valve B2. In practice, the outer diameter of the connecting member 112 is smaller than that of the front member 111, and the axial length of the connecting member 112 is greater than that of the front member 111.

In a preferred embodiment, the front member 111 and the connecting member 112 are integrally made of a titanium alloy, which can reduce the possibility of screw slippage due to abraded thread structure of the first thread hole 1112 and the second thread hole 1121. A main body 11 made of a titanium alloy is harder to manufacture than a main body 11 made of an aluminum alloy or a copper alloy is; however, the former would have a relatively strong structure, which can thus prevent screw slippage. Moreover, since the tire pressure gauge 1 of the present disclosure is fastened to the tire B1 and the connector assembly 10 is exposed to external environment, the connector assembly 10 is susceptible to damage such as rust caused by rain, air, etc. Therefore, the use of titanium alloy can prevent the connector assembly 10 from the aforementioned damage.

Figure 7:
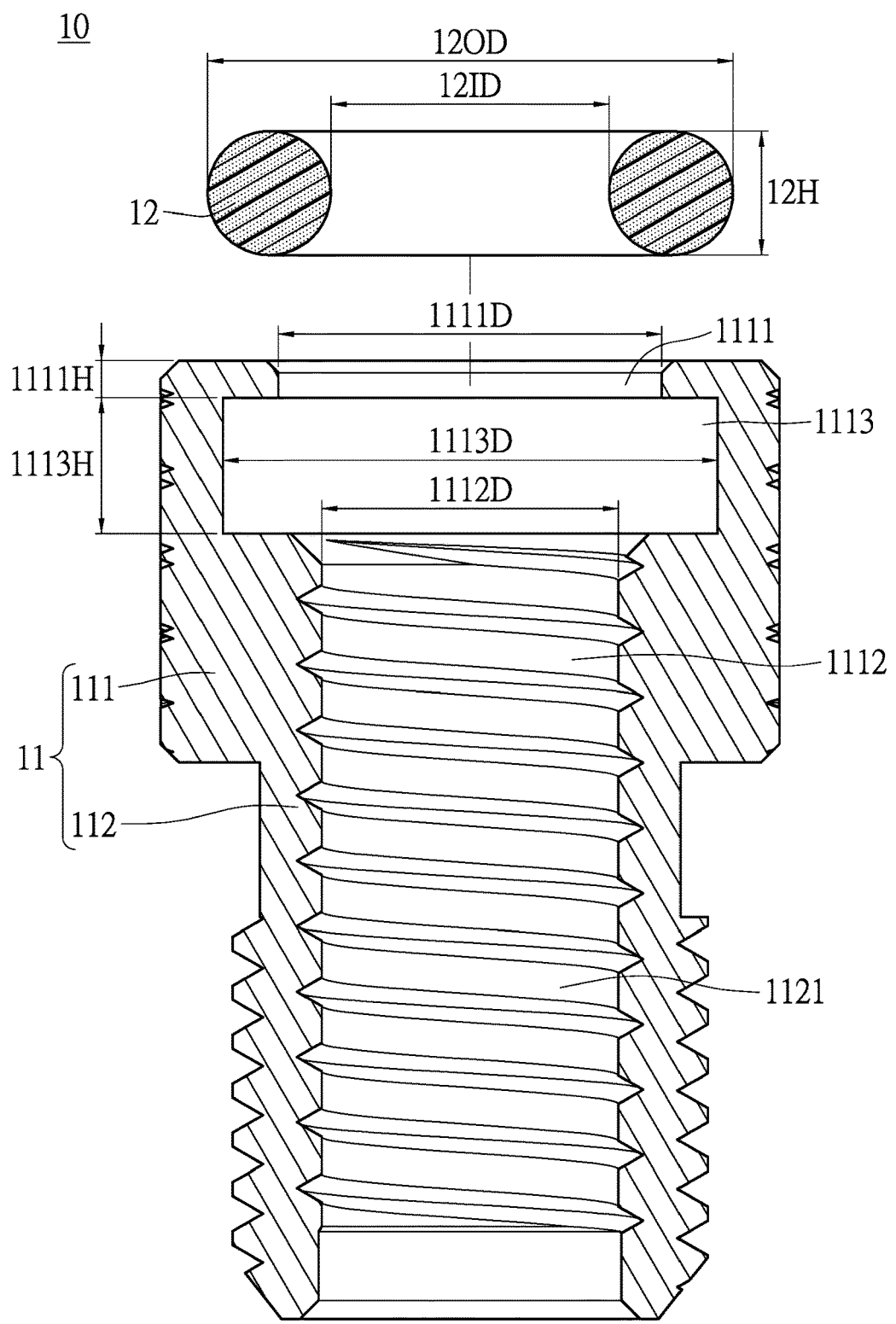
Figure 8:
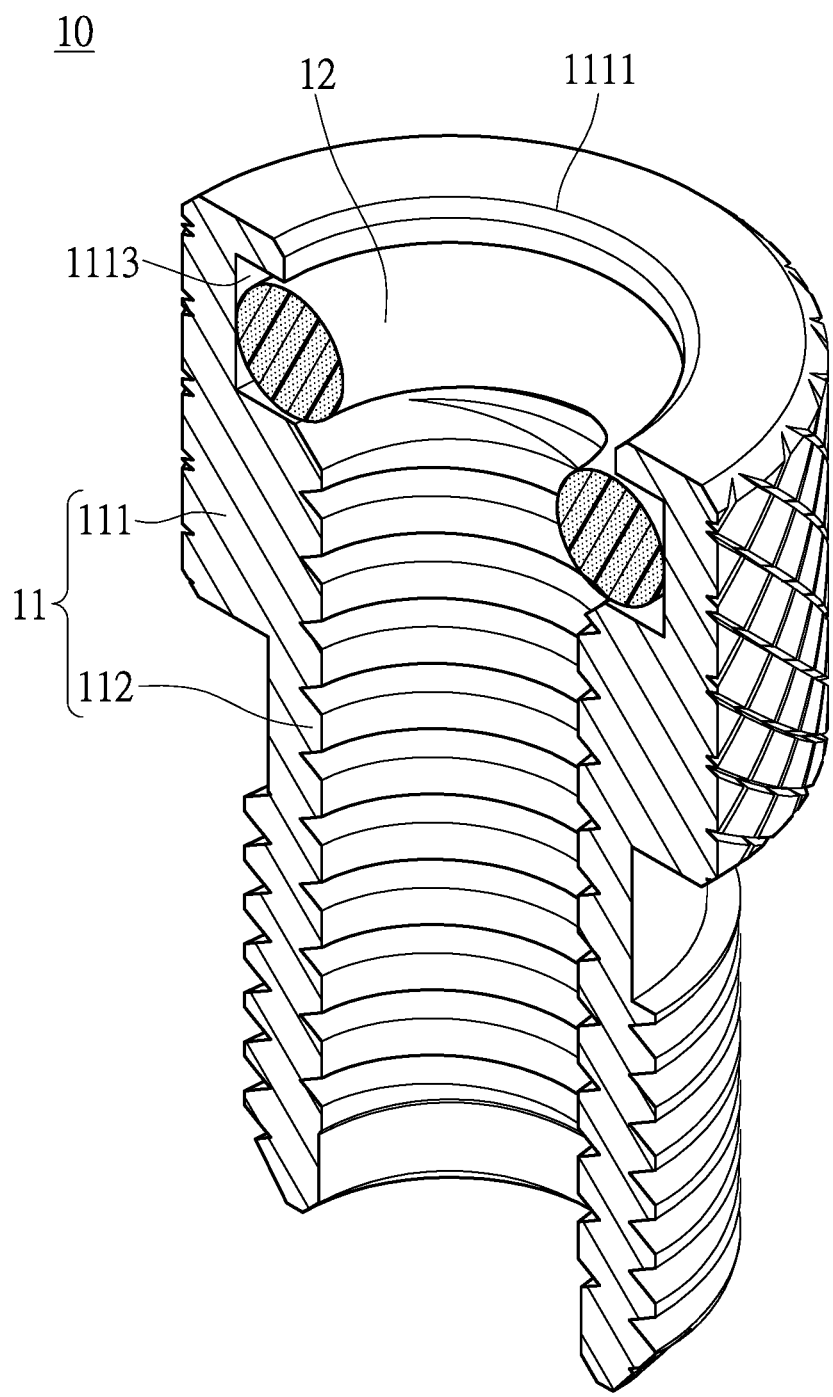
FIG. 8 and FIG. 9 are sectional views illustrating the connector assembly of the tire pressure gauge according to the present disclosure.
Figure 9:
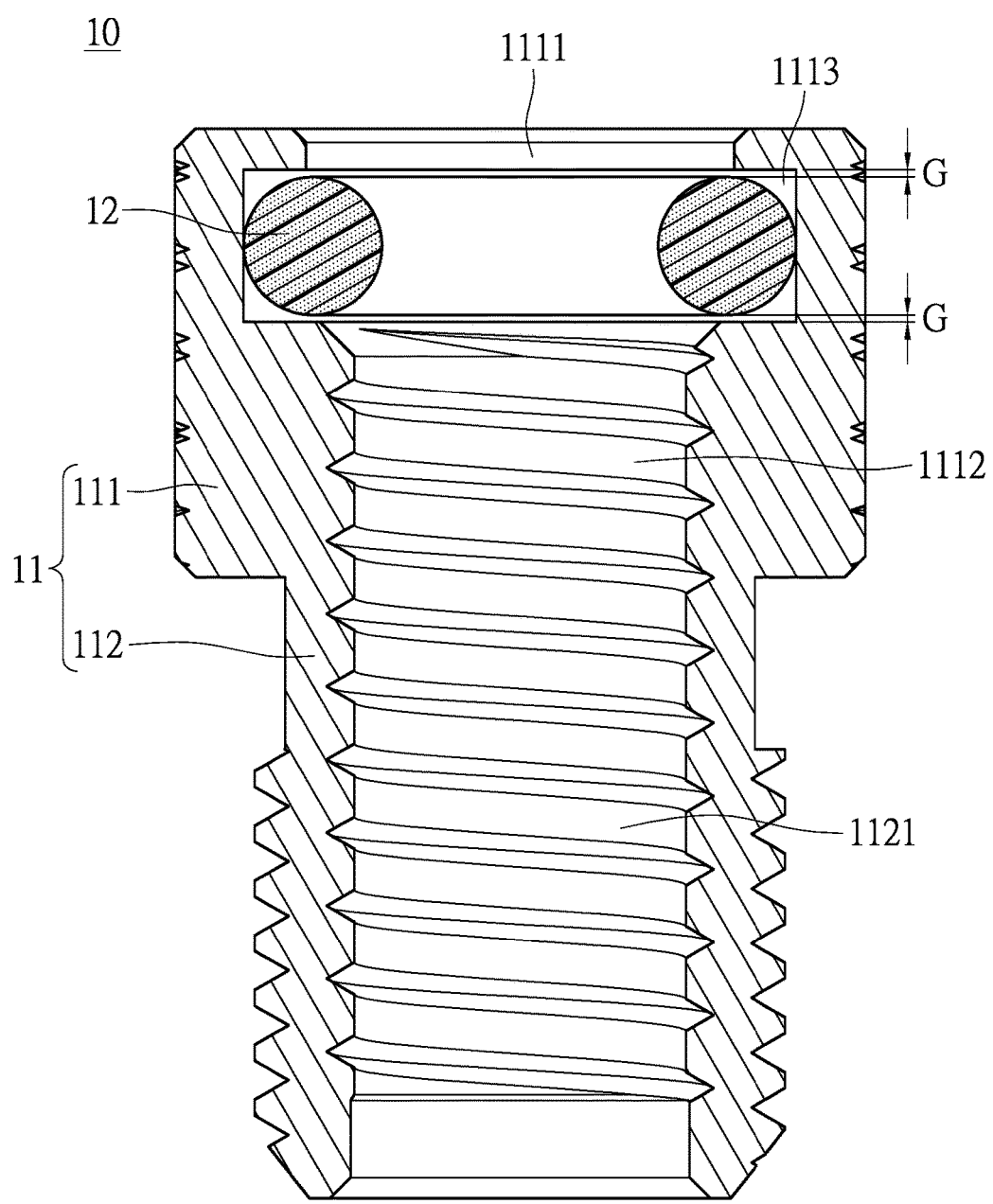

The air-tight member 12 is annular and made of an abrasion-resistant material. The air-tight member 12 can be disposed in the accommodating channel 1113 by passing through the opening portion 1111. With reference to FIG. 7, the cross section of the air-tight member 12 can be a circle, which can achieve a higher effect of airproofing. It should be noted that the outer diameter 12OD of the air-tight member 12 is smaller than the inner diameter 1113D of the accommodating channel 1113, and the thickness 12H of the air-tight member 12 is smaller than the axial depth 1113H of the accommodating channel 1113. That is to say, with reference to FIG. 9, when the air-tight member 12 passes through the opening portion 1111 towards the accommodating channel 1113, the outer surface of the air-tight member 12 is squeezed by the inner surface of the accommodating channel 1113, and a gap G is formed between the air-tight member 12 and the accommodating channel 1113 in the axial direction.

The inner diameter 12ID of the air-tight member 12 is smaller than that of the second thread hole 1121. Therefore, with reference to FIG. 4, when the French air valve B2 is engaged with the first thread hole 1112 and the second thread hole 1121, the circumference of the air-tight member 12 is squeezed by the inner surface of the accommodating channel 1113, and the inner surface of the air-tight member 12 is squeezed by the French air valve B2. When the air-tight member 12 deforms due to the press from the French air valve B2, the gap G vanishes. In other words, before the connector assembly 10 is fastened to the French air valve B2, a gap G exists between the air-tight member 12 and the inner surface of the accommodating channel 1113 in the axial direction, and when the connector assembly 10 is fastened to the French air valve B2, the inner surface of the air-tight member 12 is squeezed by the French air valve B2 so that the air-tight member 12 deforms to fill the gap G. In this way, when the connector assembly 10 is fastened to the French air valve B2, the air-tight member 12 can securely adhere to the French air valve B2 and the inner surface of the accommodating channel 1113.

In a preferred embodiment, the Shore hardness of the air-tight member 12 is no less than 65, and the difference between the outer diameter 12OD of the air-tight member 12 and the inner diameter 1113D of the accommodating channel 1113 is 0.5 mm. Furthermore, the difference between the thickness 12H of the air-tight member 12 and the axial depth 1113H of the accommodating channel 1113 is 0.2 mm, and the difference between the inner diameter 121D of the air-tight member 12 and the outer diameter of the French air valve B2 is 0.3 mm to 0.5 mm. In this manner, when the air-tight member 12 is disposed in the accommodating channel 1113 and the connector assembly is engaged with the French air valve B2, the air-tight member 12 can be in tight contact with the inner surface of the accommodating channel 1113 and the circumference of the French air valve B2.

It should be noted that, in a preferred embodiment, the inner diameter 1111D of the opening portion 1111 ranges from 6.2 mm to 6.3 mm, and the inner diameter 1113D of the accommodating channel 1113 is 1.2 to 1.3 times larger than the inner diameter 1111D of the opening portion 1111. Furthermore, the inner diameter 1111D of the opening portion 1111 is 1.3 times larger than that of the first thread hole 1112, and the axial depth 1111H of the opening portion 1111 is 4 to 5 times larger than that of the accommodating channel 1113. Through the above manner, the air-tight member 12 can pass through the opening portion 1111 to be disposed in the accommodating channel 1113; furthermore, with the designed inner diameter and axial depth of the opening portion 1111 together with the design that the air-tight member 12 can be squeezed by the inner surface of the accommodating channel 1113, when the connector assembly 10 is not connected to the French air valve B2, the air-tight member 12 is not thrown out from the opening portion 1111 due to the high pressure (100 psi) inside the tire and the French air valve B2.

In summary, the connector assembly and the gauge assembly can engage each other so that the tire pressure gauge of the present disclosure can be fastened to the French air valve on the tire of a bicycle. Moreover, the bicycle rider can retrieve tire pressure information through an external communication device so as to track the tire status at any time. In preferred embodiments, the connector assembly is made of a titanium alloy so that screw slippage due to abraded thread structure on both the connector assembly and the French air valve can be avoided. Furthermore, the connector assembly being made of titanium alloy can prevent damage such as rust caused by the exposure to external environment. In addition, through the designed inner diameters, axial depths of the connector assembly and the accommodating channel, and the inner diameter and outer diameter of the gas-tight member, the gas-tight member can achieve the effect of airproofing when engaged with the connector assembly and the French air valve, and can further prevent the gas-tight member from being thrown out of the connector assembly when the connector assembly and the French air vale are not engaged with each other.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A tire pressure gauge for a bicycle, wherein the tire pressure gauge is fastened to an air valve and measures tire pressure at any time during the travel of the bicycle, the tire pressure gauge comprising:
    a connector assembly made of an abrasion-resistant material, the connector assembly including:
        a main body including:
            a front member having a connection end and an extension end, the front member including an opening portion, a first thread hole, and an accommodating channel, wherein the opening portion is located at the connection end for being connected with the air valve, the opening portion extending inwards, the first thread hole is located at the extension end, and the accommodating channel is located between the opening portion and the first thread hole, in which the opening portion, accommodating channel, and the first thread hole are coaxial and communicate with each other, and in which the axial depth of the opening portion is smaller than that of the accommodating channel, and the axial depth of the accommodating channel is smaller than that of the first thread hole; and
            a connecting member which is connected to an end of the front member and integrally formed therewith, the connecting member including a second thread hole communicating with the first thread hole, being coaxial therewith, and having an inner diameter the same as the inner diameter of the first thread hole; and
        a gas-tight member disposed in the accommodating channel by passing through the opening portion, the gas-tight member being made of an abrasion-resistant rubber and having an outer diameter smaller than that of the accommodating channel, a thickness smaller than the axial depth of the accommodating channel, and an inner diameter smaller than that of the second thread hole; and
    a gauge assembly disposed at an end of the connecting member opposite the other end where the connecting member is connected to the front member, the gauge assembly including a wireless transmission unit and a processing unit, wherein the processing unit measures the pressure of the air entering the gauge assembly and generates an tire pressure information correspondingly, and wherein the wireless transmission unit is electrically connected to the processing unit and an external communication device so as to transmit the tire pressure information to the external communication device,
    wherein a part of the air valve is engaged with the first thread hole and the second thread hole, and the gas-tight member is closely engaged with the part of the air valve that is in the accommodating channel.

2. The tire pressure gauge according to claim 1, wherein the main body of the connector assembly is integrally made of titanium alloy.

3. The tire pressure gauge according to claim 2, wherein the gas-tight member has a Shore hardness of no less than 65.

4. The tire pressure gauge according to claim 1, wherein a thread structure is formed on the circumference of an end portion of the connecting member opposite the front member.

5. The tire pressure gauge according to claim 1, wherein the inner diameter of the opening portion ranges from 6.2 mm to 6.3 mm.

6. The tire pressure gauge according to claim 1, wherein the difference between the inner diameter of the accommodating channel and the outer diameter of the gas-tight member is 0.5 mm.

7. The tire pressure gauge according to claim 1, wherein the difference between the axial depth of the accommodating channel and the thickness of the gas-tight member is 0.2 mm.

8. The tire pressure gauge according to claim 1, wherein the axial depth of the accommodating channel is 4 to 5 times larger than that of the opening portion.

9. The tire pressure gauge according to claim 1, wherein the inner diameter of the accommodating channel is 1.2 to 1.3 times larger than that of the opening portion.

10. The tire pressure gauge according to claim 1, wherein the inner diameter of the opening portion is 1.3 times larger than that of the first thread hole.

* * * * *